United States Patent
Roy et al.

(12) 
(10) Patent No.: US 9,422,424 B2
(45) Date of Patent: Aug. 23, 2016

(54) CONSISTENT SLIP MASTERBATCH FOR POLYETHYLENE FILMS

(71) Applicant: Ingenia Polymers, Inc., Houston, TX (US)

(72) Inventors: Sushant D. Roy, Houston, TX (US); Edward G. Hindy, Fayetteville, GA (US)

(73) Assignee: Ingenia Polymers, Inc., Houston, TX (US)

(*) Notice: Subject to any disclaimer, the term of this patent is extended or adjusted under 35 U.S.C. 154(b) by 0 days.

(21) Appl. No.: 14/942,169

(22) Filed: Nov. 16, 2015

(65) Prior Publication Data

US 2016/0090477 A1    Mar. 31, 2016

Related U.S. Application Data

(63) Continuation of application No. 14/604,988, filed on Jan. 26, 2015, now abandoned.

(60) Provisional application No. 62/057,135, filed on Sep. 29, 2014.

(51) Int. Cl.
| | | |
|---|---|---|
| *C08L 23/06* | (2006.01) | |
| *C08J 5/18* | (2006.01) | |
| *C08K 3/34* | (2006.01) | |

(52) U.S. Cl.
CPC ........ *C08L 23/06* (2013.01); *C08J 5/18* (2013.01); *C08K 3/34* (2013.01); *C08J 2323/06* (2013.01); *C08J 2445/00* (2013.01); *C08J 2483/04* (2013.01); *C08L 2203/16* (2013.01); *C08L 2205/03* (2013.01); *C08L 2207/066* (2013.01); *C08L 2310/00* (2013.01)

(58) Field of Classification Search
None
See application file for complete search history.

(56) References Cited

U.S. PATENT DOCUMENTS

| | | |
|---|---|---|
| 4,692,379 A | 9/1987 | Keung et al. |
| 4,734,317 A | 3/1988 | Bothe et al. |
| 4,925,728 A | 5/1990 | Crass et al. |
| 5,077,127 A | 12/1991 | Mori et al. |
| 5,306,559 A | 4/1994 | Christopherson |
| 5,489,473 A | 2/1996 | Wilkie |
| 5,792,549 A | 8/1998 | Wilkie |
| 5,840,419 A | 11/1998 | Alder |
| 5,969,007 A | 10/1999 | Janssens |
| 5,972,496 A | 10/1999 | Bader et al. |
| 6,602,609 B1 | 8/2003 | Kong |
| 6,682,822 B2 | 1/2004 | Cretekos et al. |
| 6,946,203 B1 | 9/2005 | Lockhart et al. |
| 7,265,183 B2 | 9/2007 | Jester |
| 7,267,862 B1 | 9/2007 | Burke et al. |
| 7,271,220 B2 | 9/2007 | Janssens et al. |
| 7,615,174 B2 | 11/2009 | Janssens et al. |
| 7,981,955 B2 | 7/2011 | Kaltenegger et al. |
| 2004/0151934 A1 | 8/2004 | Schwark et al. |
| 2006/0177653 A1 | 8/2006 | Rivett et al. |
| 2013/0285217 A1 | 10/2013 | Yamaguchi et al. |
| 2014/0004336 A1 | 1/2014 | Dou et al. |
| 2015/0203643 A1 | 7/2015 | Alric et al. |

FOREIGN PATENT DOCUMENTS

| | | |
|---|---|---|
| WO | 03/004269 | 1/2003 |
| WO | 2010/039376 | 4/2010 |
| WO | 2014/014833 | 1/2014 |

*Primary Examiner* — Marc Zimmer
(74) *Attorney, Agent, or Firm* — Timothy M. McCarthy; Clark Hill PLC

(57) ABSTRACT

A masterbatch of additives is useful for maintaining a constant and reduced coefficient of friction in polyethylene (PE) based films. The masterbatch is a compounded blend of siloxane additive in conjunction with a mineral, a cyclic olefin copolymer and, optionally, an antioxidant. These additives are different from the polar additives used in the past to reduce COF of PE films and do not have inherent incompatibility with the nonpolar PE matrix.

24 Claims, No Drawings

CONSISTENT SLIP MASTERBATCH FOR POLYETHYLENE FILMS

This application claims priority to U.S. Provisional. Patent Application Ser. No. 62/057,135, entitled "CONSISTENT SLIP MASTERBATCH FOR POLYETHYLENE FILMS," filed Sep. 29, 2014, the entire content of which is incorporated by reference.

BACKGROUND

This invention relates to the field of polymer processing where a specific polymer and additives have been blended to form a composition that helps in maintaining a constant coefficient of friction in Polyethylene (PE) based films.

Polyethylene due to its chemical composition is non polar in nature. Polyethylene also due to its specific chemical characteristics is a material of choice in the flexible packaging industry and is used to make bags, containers and consumer household products. However, polyethylene has a very high coefficient of friction and the same results in issues related to conversion for a film converter. Additives such as Fatty Acid. Amides (Erucamide, Oleamide etc.) are commonly added to the Polyethylene film so as to reduce the Coefficient of Friction and help with ease of conversion. These additives are polar in nature and because of inherent incompatibility with the nonpolar PE matrix, bloom to the surface as a function of time. Whereas, the presence of slip on the surface helps with the conversion process by lowering the COF; the same also causes problems in printing and lamination. Variation of COF and inadequate printing are some of the most common issues experienced by converters.

U.S. Pat. No. 6,682,822 describes the use of cross-linked poly-siloxane as an anti-blocking agent in a Multilayer Polymeric Films.

U.S. Pat. No. 7,267,862 describes the use of primary and secondary fatty amide additives to provide a constant coefficient of friction (COF) in polyolefin films.

U.S. Pat. No. 4,692,379 describes the use of a silicone oil in a heat sealable film application.

U.S. Pat. No. 4,734,317 describes the use of polydialkyl siloxane in a multilayer polyolefin films.

U.S. Pat. No. 4,925,728 refers to the use of polydiorgano siloxane in a bi-axially stretched multilayer film.

U.S. Pat. No. 5,489,473 mentions the use of crosslinked silicone in the cold seal release skin layer of a multilayer film.

U.S. Pat. No. 5,792,549 describes the use of crosslinked silicone in multilayer films.

U.S. Pat. No. 5,840,419 refers to the use of partially crosslinked siloxane which are in the form of elastomeric particles in multilayer polyolefin films.

U.S. Pat. No. 5,969,007 mentions the use of silicate anti-blocking particles in polyolefin films.

International Patent Publication WO 2003/004269 presents the use of polymethyl methacrylate (PMMA) pearls in the exterior layer of Polyolefin films that do not migrate.

U.S. Pat. No. 5,077,127 discloses the use of a copolymer or mixtures of polymerized isobutyl methacrylate and methyl ethyl acrylate in polyolefin films.

U.S. Pat. No. 7,271,220 describes the use of a masterbatch composition containing a polyolefin base resin, polymethyl methacrylate (PMMA) pearls in polyolefin films.

U.S. Pat. No. 7,615,174 refers to use PMMA pearls and a terpolymer of ethylene, methylacrylate and glycidylmethacrylate in polyolefin films.

U.S. Pat. No. 5,840,419 mentions the use of non-crosslinked polysiloxane in polyolefin films.

U.S. Pat. No. 5,306,559 refers to the use of polyamides as slip agents in polyolefin films.

U.S. Pat. No. 5,972,496 refers to the use of crosslinked hydrocarbyl substituted polysiloxane and silica antiblock particles in polyethylene film structures.

U.S. Pat. No. 6,602,609 describes the use of a non-migratory polydimethyl siloxane block copolymer in multilayer polymeric films.

U.S. Pat. No. 6,946,203 refers to a multilayer polyolefin substrate with low density cores and stiff outer layers.

U.S. Pat. No. 7,267,862 B1 describes the use of a primary and secondary amide in achieving controlled slip properties for PE based films.

International Patent Publication WO 2014/014833 A1 describes the use of Polyethylene, a functionalized polyolefin (ethylene ethyl acrylate maleic anhydride copolymer), functionalized poly-siloxane and optional additives in achieving non migratory slip properties for PE films.

International Patent Publication WO 2010/039376 A1 refers to a film containing slip agent, cavitating agent and an antiblock; the film having controlled properties.

SUMMARY

The current invention pertains to a masterbatch of additives useful for maintaining a constant and reduced coefficient of friction in Polyethylene (PE) based films. The masterbatch in the present invention is a compounded blend of additives. The masterbatch uses a siloxane additive in conjunction with a mineral, a cyclic olefin copolymer and an antioxidant. These additives are different from the polar additives used in the past to reduce COF of PE films and do not have inherent incompatibility with the non-polar PE matrix. Thus, they do not bloom to the surface over time. This reduces problems in printing and lamination of the PE films.

The cyclic olefin copolymer (COC) that is preferably used in this masterbatch may have an enhanced high temperature resistance as well due to its chemical structure. The cyclic olefin copolymer preferably used in the masterbatch may have a very high glass transition temperature that further helps in the antiblocking properties.

The siloxane preferably used in the masterbatch further helps to lower the COF of the PE films due its specific chemical nature.

The masterbatch also contains a mineral that helps further in enhancing the antiblocking property. The mineral can also have additional benefits in improving the overall bubble stability of the films.

Using the masterbatch, a blend of resins and additives can be used to make films with a lower coefficient of friction than films made with only Polyethylene. The masterbatch of the present invention further helps in providing a consistent coefficient of friction (COF) when added to Polyethylene films. The consistent coefficient of friction is desirable in applications where polar resins such as Nylon are involved or when one of the layers in a multilayer polyolefin film is being laminated. Embodiments of the present masterbatch can produce a consistent dynamic coefficient of friction of about 0.25 for PE films.

DETAILED DESCRIPTION

Given below in the following sections are some definitions and examples which may help in the description of the invention.

"Additives": Chemicals and/or resins that due to their specific chemical characteristics, are capable of imparting distinct properties to the system in which they are introduced. An additive is usually one of the minor components of a multicomponent polymer blend.

Resins include but are not limited to Polyethylene (LDPE, LLDPE, HDPE), cyclic olefin copolymer (COC) and Siloxane.

"Extruder": The term extruder and extrusion used herein refers to all types of melt extrusion operations and apparatus that are used for melting plastic polymer into molten form and then converting the same into a certain shape.

"Blown Film Extrusion": Methods and equipment used to convert resins and/or masterbatch to a film in which a tube of polymer is extruded through a die, inflated, and collapsed into a film.

"Injection Molding": Manufacturing process for producing parts by injecting polymer into a mold to cool and harden.

The word "film" refers to polymer that has been converted to a thin structure with thickness ranging from less than a mil to a few mils (1 mil=25.4 micron).

"Melting point": It is the peak melting temperature of polymer that is measured by analytical tools such as differential scanning calorimetry ("DSC") or any other instrument.

"Glass Transition Temperature"—Temperature at which there is a transition from glassy to rubbery state.

"Carrier polymer": It is the polymer used typically as the continuous phase that when combined with fillers, colorants or additives, will encapsulate them to form a masterbatch.

"Masterbatch": It is a concentrate of colorants or additives properly dispersed into a carrier polymer, which is subsequently blended into the base polymer rather than adding the filler, colorant or additive directly to the base polymer.

"Slip Masterbatch": Additives and resins that have been formulated to form a masterbatch that helps to lower the coefficient of friction and provide a steady constant value.

"Antiblock Additives": Additives that can be used to reduce adhesion between two layers of film in contact with each other.

Preferred base polymers of the present disclosure include but are not limited to polyolefins such as polyethylene, polypropylene and blends thereof.

The slip masterbatch of this invention includes additives known to those skilled in the art such as minerals, antioxidants, and resins such as cyclic olefin copolymer (COC), and siloxane.

The high glass transition temperature of COC helps in providing a rigid matrix. Once the COC cools down from the molten state, it forms a network domain which is similar to "golf balls" on the surface of the film. The same helps in lowering COF of the base PE resin used to make films. Preferably, the COC is present at about 50% to about 70% by weight of the masterbatch. COC used in this masterbatch is a specific grade with a high glass transition temperature. The high glass transition is expected to contribute to a desired effect in reducing coefficient of friction when added to PE films. Different grades of COC are available from manufacturers but knowledge about the chemistry of the material and performance requirements of the application contribute to a specific grade of COC being preferred. Further, the formulation was optimized taking into consideration both economics and performance into consideration. 60% of COC by weight in the masterbatch is preferred based on performance, but considering the chemistry and application, COC in the range of 50 to 70% is effective in providing the specific COF range. The converter/manufacturer of the film would be able to adjust the desired effects by increasing or decreasing the let-down ratio (LDR), which is the percentage of masterbatch added while making the film. In preferred examples, the COC is present at a LDR in the film of about 3% to about 7.2%, more preferably at about 4.2% to about 6%.

Siloxane additive is an ultra-high molecular weight resin that further acts in a synergistic way with the rigid COC resin in lowering the COF. Without being bound by theory, it is presumed that COC and siloxane form an interlocking rigid structure and the enhanced rigidity further helps in lowering COF. Preferably, the siloxane is present at a LDR of about 0.5% to about 2% by weight of the final film, more preferably at about 1.05-1.50%, and more preferably at about 1%. Preferably, the siloxane is added to the masterbatch as part of a formulation including 50% siloxane in a polyethylene carrier. This siloxane formulation is preferably present at about 30% to about 50% by weight of the masterbatch. The siloxane formulation used in this masterbatch is preferably a grade where the siloxane is included in a LDPE carrier resin and is preferably a high molecular weight siloxane. Different grades of siloxane are available from manufacturers but knowledge about the chemistry of the material and performance requirements of the application result in a specific grade of siloxane being preferred. Further, the formulation has been optimized taking into consideration both economics and performance.

A preferred siloxane formulation is Dow Corning® (Midland, Mich.) MB50-802. MB50-802 is a pelletized formulation containing 50% of an ultra-high molecular weight siloxane polymer dispersed in low density polyethylene (LDPE) polymer. The siloxane contained in the formulation is a mixture of dimethyl siloxane (dimethylvinyl-terminated and hydroxyl-terminated) and dimethyl, methylvinyl siloxane (dimethylvinyl-terminated). In addition to LDPE, it also contains silicon dioxide. MB50-802 is suggested for use by the manufacturer at about 0.1% to about 7%. In the present masterbatch, about 30% of the siloxane formulation in the masterbatch by weight is desired. However, based on performance and considering the chemistry and application, a siloxane formulation in the range of 30% to 50% is effective in providing the specific COF range. The converter/manufacturer of the film could adjust the desired effects by increasing or decreasing the let-down ratio (LDR), which is the percentage of masterbatch added while making the film.

A LDR of about 5 to about 12% of the masterbatch in the film is preferred, with a LDR of about 7% to about 10% being more preferred, and a LDR of about 7% being more preferred. This LDR is considered effective and acceptable from the converter/manufacturer's perspective.

Minerals preferably used in the present invention include but are not limited to calcium carbonate, silica, synthetic silica talc, and combinations thereof. Diatomaceous earth (DE), which is primarily silica, is an example of a mineral additive that may be used in the present masterbatch. DE because of its structure is a commonly used antiblock additive. The same in conjunction with COC and Siloxane helps further to optimize the performance.

Preferably, the mineral additive is present at about 5,000-20,000 ppm in the final film, more preferably between about 5,000-12,000 ppm in the final film, and more preferably about 7,000-10,000 ppm in the final film. In the masterbatch, the mineral additive is preferably present at about 9-10% or more preferably at about 9.9%.

Primary and secondary antioxidants may be used in the formulation of the present invention. The antioxidant may be used as a processing stabilizer. Preferably, the antioxidant is present at about 0.1% to about 1% by weight of the masterbatch.

Phenols (Primary Antioxidants) particularly useful in the present invention include, but are not limited to penterythritol tetrakis (3-(3,5-di-t-butyl-4-hydroxyphenol)propionate),octadecyl3,5-Di-(tert)-butyl-4-hydroxyhydrocinnamate,1,3,5-tris(3,5-di-tert-butyl-4-hydroxybenzyl)-1,3,5-triazine-2,4,6(1h,3h,5h)-trione,1,3,5-trimethyl-2,4,6-tis(3,5-di-tert-butyl-4-hydroxybenzuyl)benzene, Octadecyl-(3-3,-di-t-butyl-4hydroxyphenol) e.g.:

(AO-1076) Octadecyl-(3-3,-di-t-butyl-4hydroxyphenol)

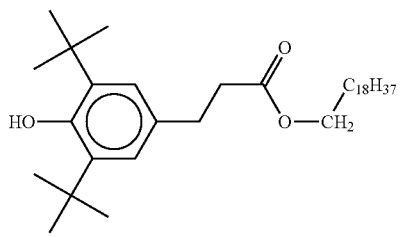

(AO-1010 {penterythritol tetrakis (3-(3,5-di-t-butyl-4-hydroxyphenol)propionate

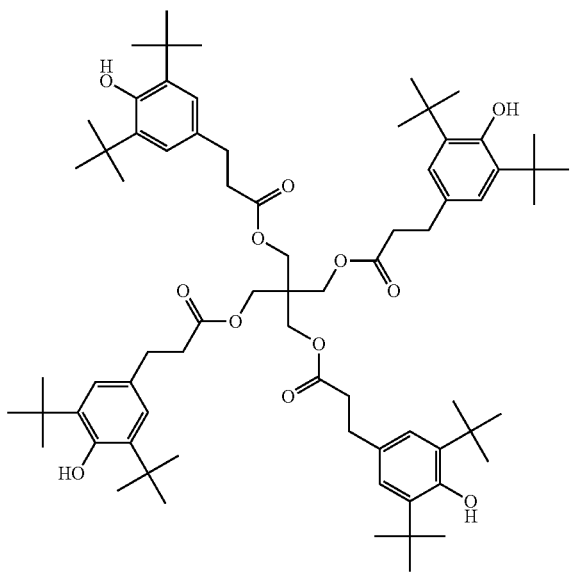 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

(AO-129) {2,2'-ethlidenebis (4,6-di-tert-butylphenol

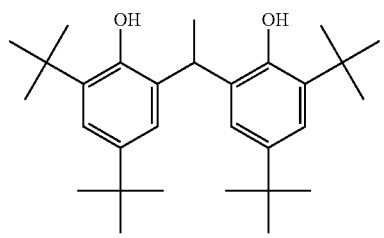 [SMILES: CC(c1cc(C(C)(C)C)cc(C(C)(C)C)c1O)c1cc(C(C)(C)C)cc(C(C)(C)C)c1O]

(AO-702) {4,4'-methylenebis(2,6-di-tertiary-butylphenol)}

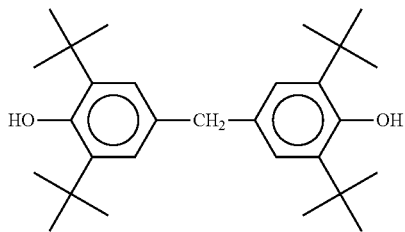

(AO-246) {2,4,6-tri-tert-butylphenol};

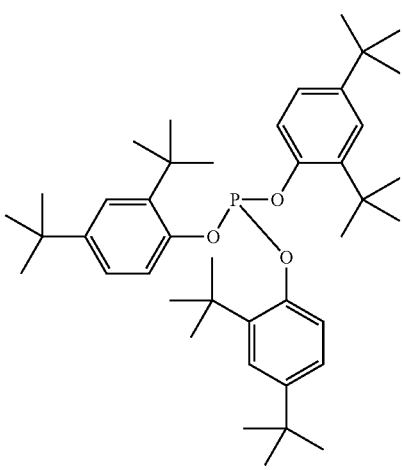 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1]

Phosphites (Secondary Antioxidants) that can be used in the present invention include, but are not limited tris-(2,4-di-t-butylphenyl)phosphite,tetrakis(2,4-di-tert-butylphenyl) [1,-1-biphenyl]-4,4'-diylbisphosphonite, bis (2,4-di-t-butylphenyl) pentaerythritol diphosphite, bis (2,4-di-t-cumylphenyl) pentaerythritol diphosphite, tetrakis(2,4-di-t-butylphenyl) 4,4'-biphenylene diphosphonite, 2,4,6 tri-t-butylphenyl 2 butyl 2 ethyl 1,3 propane diol phosphite, distearyl pentaerythritol diphosphite, tris(nonylphenyl) phosphite and trilauryl trithio phosphite, e.g.

(AO-168): {tris-(2,4-di-t-butylphenyl)phosphite}

(AO-62): {bis (2,4-di-t-butylphenyl) pentaerythritol diphosphite}

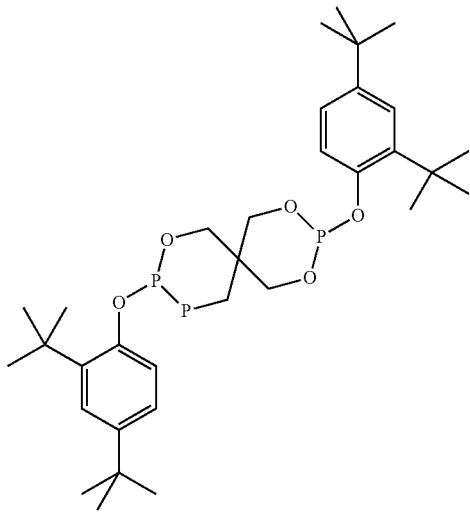

AO-641 {2,4,6 tri-t-butylphenyl 2 butyl 2 ethyl 1,3 propane diol phosphite}

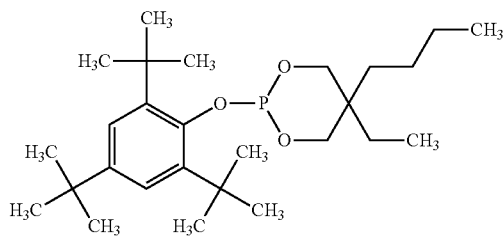

AO-PEPQ {Tetrakis (2,4-di-tert-butylphenyl)[1,1-biphenyl]-4,4'-diylbisphosphonite}

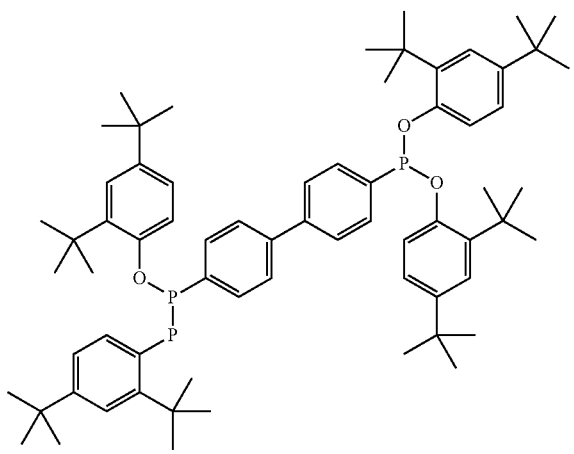

The masterbatch of the present invention can be used in but is not limited to use in processes including blown film extrusion and injection molding.

The first step in a process for preparing the masterbatch is feeding the polymer additives to the extruder. The different polymer additives can be either pre-blended or fed as a blend to the extruder or even metered independently. Pre-blending can be accomplished by weighing components and blending them together. Blending can be achieved by any means known in the art, including, but not limited to tumble blending, ribbon blending, hand mixing, low-intensity and high-intensity mixing. Metering additives independently can be achieved either by volumetric or loss-in-weight feeders.

The polymer additives or the blend can be flood fed or starve fed to the extruder. The extruder can be of any type, including, but not limited to, a single screw extruder, a twin screw extruder, a planetary extruder or any combination thereof. The extruder performs the function of shearing, mixing the additive or additive blends and melting or softening at least one component of the additive blend. The remaining unmelted particles that are subjected to shear and/or heat are finely dispersed in the melted additive.

The additive blend is converted into pellets downstream of the extruder. This can be accomplished by any method known in the art. Typically the additive blend is forced through a die, the strand can be cut directly at the die face or the strand can be pulled and cooled and subsequently cut into pellets.

During the manufacture of multilayer films on a blown film line, the slip masterbatch is introduced to the extruder in a manner so that it forms a sealant layer.

While using the slip masterbatch the temperature of the zones where this slip masterbatch is introduced is kept few degrees lower than the temperature would be if the slip masterbatch was not being used in those same zones.

EXAMPLES

Examples of the additive masterbatch were produced and further added to a mono-layer lab line (Examples 1-3) and also to a multilayer lab line (Example 4) to create films for evaluation. A monolayer lab line is a blown film extruder where resins and/or additives are added to only 1 extruder, which is then converted into a blown film. A multilayer blown film line can have 3 or 5 or 7 or 9 or 11 extruders, with resin and/or additives added to each extruder, and the film that comes out of the extruder will have 3 or 5 or 7 or 9 or 11 layers. The films produced in Examples 1-3 had 1 layer and the film produced in Example 4 had 3 layers.

For evaluating the efficiency of the slip masterbatch, a Coefficient of Friction (COF) tester was used. The method followed was ASTM D 1894. The details of this method are available from ASTM International (West Conshohocken, Pa.). Generally, this test method covers the determination of the coefficients of starting and sliding friction of plastic film and sheeting when sliding over itself or other substances at specified test conditions. The procedure permits the use of a stationary sled with a moving plane, or a moving sled with a stationary plane. Both procedures yield the same coefficients of friction values for a given sample. A COF unit tester was used as the primary analytical tool to measure the performance of the slip masterbatch, per ASTM D 1894.

Measurement of COF data over regular time intervals was used to characterize the efficiency of various embodiments of the slip masterbatch after they were added to a PE film.

A parameter of significant importance was the measured coefficient of friction (COF) value for the films made with an example of the masterbatch of the invention.

Another parameter of equal importance was monitoring COF values of the film samples over time to determine whether COF was maintained over time.

Examples 1-3

Examples of the slip masterbatch of this present invention were prepared on a twin screw extruder (ZSK-25; 40 L/D Coperion). A siloxane formulation was used as the polymeric additive along with diatomaceous earth (DE) as the mineral, cyclic olefin copolymer (COC), and antioxidant. The siloxane formulation used was obtained from Dow Corning (Midland, Mich.) as masterbatch MB50-802. The COC was obtained from TOPAS Advanced Polymers (Frankfurt, Germany) as grade 5013×14. This COC grade is copolymerized from norbornene and ethylene using a metallocene catalyst. Grade 5013 has a norbornene content of about 75% and a heat distortion temperature of about 130° C. The antioxidant was a 1:4 blend of BASF® IRGANOX® 1076 and BASF® ERGAFOSO 168, BASF® IRGANOX® 1076 is the sterically hindered phenolic antioxidant octadecyl-3-(3,5-di-tert.butyl-4-hydroxyphenyl)-propionate. BSAF® IRGAFOS® 168 is the secondary antioxidant and hydrolytically stable phosphite processing stabilizer Tris(2, 4-ditert-butylphenyl)phosphite. This blend of antioxidants is also sold commercially as BASF® IRGANOX® B 900. Any suitable antioxidant from any supplier can be used, particularly those having the same CAS# as the preferred antioxidants described herein.

Table I below highlights different formulations used to make a first set of example mono layer films for evaluation:

TABLE I

| Example | % Siloxane (from Dow Corning MB50-802) | % COC (TOPAS 5013x14) | DE (ppm) | Antioxidant (AO 1076 and AO 168) |
|---------|----------------------------------------|-----------------------|----------|----------------------------------|
| #1 | 0.525 | 12 | 15,000 | 0.1% |
| #2 | 0.75 | 12 | 15,000 | 0.1% |
| #3 | 2.0 | 5 | 7,500 | 0.1% |

In Example 1, 0.525% siloxane was present in the final LDPE film. MB50-802 was used as the main polymeric additive in the masterbatch, at a corresponding let down ratio (LDR) of 1.05% in the final film, along with DE, Cyclic Olefin Copolymer, and antioxidant in the amounts specified. All amounts are based on the film.

In Example 2, 0.75% siloxane was present in the final LDPE film. MB50-802 was used as the main polymeric additive in the masterbatch at a corresponding let down ratio (LDR) of 1.5% in the final film, along with DE, Cyclic Olefin Copolymer, and antioxidant in the amounts specified. All amounts are based on the film.

In Example 3, 2% siloxane was present in the final LDPE film, MB50-802 was used as the main polymeric additive in the masterbatch at a corresponding let down ratio (LDR) of 4% in the final film, along with DE, Cyclic Olefin Copolymer, and antioxidant in the amounts specified. All amounts are based on the film.

In each example film, the remainder of the film was polyethylene (LDPE).

The mono layer film samples as made as shown in Table I above were evaluated for COF. COF values were measured as a function of time. The results are shown in Table II below.

TABLE II

| Example | Film thickness (mil) | Film Type | Dynamic COF (measured over 60 days) |
|---------|----------------------|-----------|--------------------------------------|
| #1 | 1 | Monolayer in LDPE resin | 0.37 +/− 0.2 |

TABLE II-continued

| Example | Film thickness (mil) | Film Type | Dynamic COF (measured over 60 days) |
|---------|----------------------|-----------|--------------------------------------|
| #2 | 1 | Monolayer in LDPE resin | 0.32 +/− 0.2 |
| #3 | 1 | Monolayer in LDPE resin | 0.25 +/− 0.2 |

Example 4

Taking both performance and economics into consideration, an additional specific exemplary combination of a siloxane formulation, COC, DE and antioxidant was designed into a masterbatch.

The masterbatch for this evaluation had the following formulation in Table III:

TABLE III

| Component | % |
|-----------|-----|
| COC | 60 |
| Siloxane Formulation | 30 |
| DE | 9.9 |
| AO | 0.1 |

Preferably, the COC is a grade comparable to TOPAS 5013×14, and the siloxane formulation is a grade comparable to Dow Corning MB50-802, which contains 50% siloxane in LDPE carrier. The antioxidant is preferably the 1:4 blend of BASF® IRGANOX® 1076 and BASF® IRGAFOS® 168 that is also referred to as BASF® IRGANOX® B 900.

The masterbatch was let down at 7% in a multilayer film, with 93% of the film being made up of LDPE resin. The multilayer film had three layers, each of which was made up of polyethylene. The sealant layer of the film included the masterbatch and was less than 0.5 mils. The overall thickness of the film was about 3 mils, A consistent dynamic COF of around 0.25 was achieved for data measured for 60 days.

In summary, monolayer and multilayer PE films were both made using examples of the masterbatch of this invention.

COF data from both mono layer and multi-layer films indicated a consistent COF. The COF values further indicated a dynamic COF value in the 0.25 range, a key requirement in multiple converting applications.

For comparison, oleamide and erucamide fatty acid derivatives are commonly used to lower the coefficient of friction in polyethylene films. Erucamide has the chemical formula $C_{22}H_{43}NO$ and oleamide has the chemical formula $C_{18}H_{35}NO$. These derivatives must "bloom" to the surface of the film before they will contribute to a decrease in the coefficient of friction of the film. Depending on the amount of oleamide or erucamide added (such as 500 ppm-1000 ppm), the coefficient of friction of the resulting film may decrease from about 0.38-0.44 to about 0.10-0.18 over the course of more than 100 hours. A control LDPE film has a coefficient of friction of about 0.60-0.75. It is well established that polar fatty acid derivatives such as oleamide and erucamide, once they bloom to the surface of a film, will be attracted to adhesives or polar substrates such as nylon used in lamination. This effectively raises the COF of the film, making film movement more difficult through printing and converting equipment.

It is significant that a consistent COF was achievable using embodiments of the masterbatch. Using standard slip additives such as erucamide, oleamide or even secondary amides doesn't provide a consistent COF. All amides are polar in nature and thereby have a tendency to bloom towards the surface resulting in a COF that gradually decreases in value over time (i.e., there is a transition from high to low COF). Also, a consistent COF in the range of 0.25 has been an elusive target for the flexible packaging customers, and the ability to achieve the same is a significant contribution of this invention. Accordingly, the reduction in coefficient of friction to about 0.25, combined with the lack of "bloom" and non-polar nature of the components, makes the present masterbatch extremely advantageous for use in polyethylene films.

REFERENCES CITED

The following documents and publications are hereby incorporated by reference.

U.S. and Foreign Patent Documents

U.S. Pat. No. 6,682,822
U.S. Pat. No. 7,267,862
U.S. Pat. No. 4,692,379
U.S. Pat. No. 4,734,317
U.S. Pat. No. 4,925,728
U.S. Pat. No. 5,489,473
U.S. Pat. No. 5,792,549
U.S. Pat. No. 5,840,419
U.S. Pat. No. 5,969,007
U.S. Pat. No. 5,077,127
U.S. Pat. No. 7,271,220
U.S. Pat. No. 7,615,174
U.S. Pat. No. 5,840,419
U.S. Pat. No. 5,306,559
U.S. Pat. No. 5,972,496
U.S. Pat. No. 6,602,609
U.S. Pat. No. 6,946,203
U.S. Pat. No. 7,267,862
International Patent Publication WO 2003/004269
International Patent Publication WO 2014/014833
International Patent Publication WO 2010/039376

What is claimed is:

1. An additive blend, comprising:
a siloxane formulation, in an amount of about 30% to about 50% by weight of the additive blend, wherein the siloxane formulation comprises siloxane in an amount of about 50% by weight of the siloxane formulation;
cyclic olefin copolymer (COC), in an amount of about 50% to about 70% by weight of the additive blend;
mineral additive, in an amount of about 9 to about 10% in the additive blend; and
one or more antioxidants in an amount of about 0.1% to about 1% by weight of the additive blend.

2. The additive blend of claim 1, wherein the siloxane formulation further comprises polyethylene.

3. The additive blend of claim 1, wherein the mineral additive is diatomaceous earth.

4. The additive blend of claim 1, wherein the one or more antioxidants comprise phenols, phosphites, or combinations thereof.

5. A polyethylene based film, comprising:
polyethylene; and
an additive blend, wherein the additive blend is dispersed throughout at least a portion of the polyethylene, wherein the additive blend comprises a siloxane formulation, cyclic olefin copolymer (COC), mineral additive, and one or more antioxidants, wherein the siloxane formulation comprises siloxane and polyethylene, and wherein the polyethylene based film has a dynamic coefficient of friction of about 0.25.

6. The polyethylene based film of claim 5, wherein the siloxane formulation comprises siloxane in an amount of about 50% by weight of the siloxane formulation.

7. The polyethylene based film of claim 5, wherein the siloxane formulation is in an amount of about 30% to about 50% by weight of the additive blend, the cyclic olefin copolymer (COC) is in an amount of about 50% to about 70% by weight of the additive blend, the mineral additive is in an amount of about 9% to about 10% in the additive blend, and the one or more antioxidants is in an amount of about 0.1% to about 1% by weight of the additive blend.

8. The polyethylene based film of claim 5, wherein the polyethylene based film comprises siloxane in an amount of about 0.5% to about 2% by weight of the polyethylene based film.

9. The polyethylene based film of claim 5, wherein the polyethylene based film comprises cyclic olefin copolymer (COC) in an amount of about 3% to about 7.2% by weight of the polyethylene film.

10. The polyethylene based film of claim 5, wherein the polyethylene based film comprises mineral additive in an amount of about 5,000 to about 20,000 ppm in the polyethylene film.

11. The polyethylene based film of claim 5, wherein the mineral additive is diatomaceous earth.

12. The polyethylene based film of claim 5, wherein the one or more antioxidants comprise phenols, phosphites, or combinations thereof.

13. The polyethylene based film of claim 5, wherein the film is a single layer or multi-layer film.

14. The polyethylene based film of claim 5, wherein the film is a multi-layer film comprising a sealant layer, wherein the sealant layer comprises polyethylene, and wherein the additive blend is dispersed throughout the polyethylene in the sealant layer.

15. A method for preparing a polyethylene based film, comprising:
preparing an additive blend, wherein the additive blend comprises a siloxane formulation, cyclic olefin copolymer (COC), mineral additive, and one or more antioxidants, and wherein the siloxane formulation comprises siloxane and polyethylene;
dispersing the additive blend in polyethylene to faun modified polyethylene; and
forming the modified polyethylene into a polyethylene based film, wherein the polyethylene based film has a dynamic coefficient of friction of about 0.25.

16. The method of claim 15, wherein the siloxane formulation is in an amount of about 30% to about 50% by weight of the additive blend, the cyclic olefin copolymer (COC) is in an amount of about 50% to about 70% by weight of the additive blend, the mineral additive is in an amount of about 9% to about 10% by weight of the additive blend, and the one or more antioxidants is in an amount of about 0.1% to about 1% by weight of the additive blend.

17. The method of claim 15, wherein the polyethylene based film comprises siloxane in an amount of about 0.5% to about 2% by weight of the polyethylene based film.

18. The method of claim 15, wherein the polyethylene based film comprises cyclic olefin copolymer (COC) in an amount of about 3% to about 7.2% by weight of the polyethylene film.

19. The method of claim 15, wherein the polyethylene based film comprises mineral additive in an amount of about 5,000 to about 20,000 ppm in the polyethylene film.

20. The method of claim 15, wherein the mineral additive is diatomaceous earth.

21. The method of claim 15, wherein the one or more antioxidants comprise phenols, phosphites, or combinations thereof.

22. The method of claim 15, wherein the polyethylene based film is a single layer or multi-layer film.

23. The method of claim 22, wherein the polyethylene based film is a multi-layer film comprising a sealant layer, wherein the modified polyethylene is formed into the sealant layer, and wherein the multi-layer film comprises additional layers.

24. The method of claim 15, wherein the forming the modified polyethylene into a polyethylene based film is by blown film extrusion or injection molding.

\* \* \* \* \*